United States Patent
Baumecker et al.

(10) Patent No.: US 10,178,001 B2
(45) Date of Patent: Jan. 8, 2019

(54) DATA DISPATCH TO VIRTUAL DATA CHANNEL FOR PRESENTATION THROUGH A DASHBOARD

(71) Applicant: Hewlett Packard Enterprise Development LP, Houston, TX (US)

(72) Inventors: Klaus Baumecker, Bondorf (DE); Falk Edelmann, Pforzheim (DE); Andreas Weber, Bondorf (DE); Frank Vosseler, Holzgerlingen (DE)

(73) Assignee: EntIT Software LLC, Sunnyvale, CA (US)

( * ) Notice: Subject to any disclaimer, the term of this patent is extended or adjusted under 35 U.S.C. 154(b) by 0 days.

(21) Appl. No.: 14/933,281

(22) Filed: Nov. 5, 2015

(65) Prior Publication Data
US 2017/0134270 A1   May 11, 2017

(51) Int. Cl.
*H04L 12/26* (2006.01)
*G06F 3/00* (2006.01)
*H04L 29/08* (2006.01)

(52) U.S. Cl.
CPC ............... *H04L 43/08* (2013.01); *G06F 3/00* (2013.01); *H04L 67/00* (2013.01); *H04L 43/045* (2013.01)

(58) Field of Classification Search
CPC ..... H04L 45/00; H04L 45/123; H04L 45/124; H04L 45/70; H04L 47/50; H04L 47/62; H04L 61/1582; H04L 67/146; H04L 67/2814
See application file for complete search history.

(56) References Cited

U.S. PATENT DOCUMENTS

| | | | |
|---|---|---|---|
| 2006/0236226 A1* | 10/2006 | Meijer | G06F 8/425 715/201 |
| 2012/0072435 A1* | 3/2012 | Han | G06F 17/241 707/754 |
| 2013/0174063 A1 | 7/2013 | Chmiel et al. | |
| 2013/0179980 A1* | 7/2013 | Beaumier | G06F 21/10 726/26 |
| 2015/0040049 A1 | 2/2015 | Vierich | |
| 2015/0153918 A1 | 6/2015 | Chen et al. | |

OTHER PUBLICATIONS

Annabol Hodges, Real-time Business Dashboards: What, Why, and How?, State of Digital Blog, Apr. 3, 2014, 5 pgs.
Flipfolio, Klipfolio Quick Start Guide, Web Page, Sep. 28, 2015, 3 pgs.
Sisense, Sisense Basic Concepts and Terminology, Sisense Webpage, No date, 10 pgs.
Tech 53, Datorama the Marketer's Hub, Webpage, 2015, 4 pgs.
Sisense, "Sisense Basic Concepts and Terminology", http://www.sisense.com/documentation/v5/sisense-basic-concepts-terminiology/, published on or before Sep. 28, 2015, 10 pgs.

\* cited by examiner

*Primary Examiner* — Benjamin H Elliott, IV
(74) *Attorney, Agent, or Firm* — Trop Pruner & Hu, P.C.

(57) ABSTRACT

In some examples, a method includes receiving a data packet through a datapath configured by a data source. The datapath may specify a data dimension of data communicated through the data packet. The method may also include identifying, from the data packet, a particular dimension value for the data dimension specified in the datapath and dispatching the data of the data packet to a virtual data channel specific to the particular dimension value to support presentation of the data through a dashboard.

18 Claims, 7 Drawing Sheets

DATA DISPATCH TO VIRTUAL DATA CHANNEL FOR PRESENTATION THROUGH A DASHBOARD

BACKGROUND

With rapid advances in technology, computing systems are increasingly prevalent in society today. Computing systems execute and support applications that communicate and process immense amounts of data. A computing system may host hundreds or thousands of applications, resulting in a complex distribution of resources to multiple virtual entities hosted by the computing system. Increasing the effectiveness, management capability, and reliability of such computing systems will increase user experience.

BRIEF DESCRIPTION OF THE DRAWINGS

Certain examples are described in the following detailed description and in reference to the drawings.

DETAILED DESCRIPTION

The disclosure herein may provide systems, methods, devices, and logic for dispatching data into virtual data channels for presentation through a dashboard. In particular, the disclosure herein may provide increased flexibility in receiving, characterizing, and presenting data through a dashboard from any number of data sources, each of which may communicate data in a particular data format or schema specific to the data source. In that regard, the data sources may communicate the data for presentation through the dashboard without an upfront transformation into a specific data schema driven by, for example, a particular visualization element of the dashboard. Thus, the features described herein may increase the flexibility and efficiency through which data may be presented through a dashboard.

Figure 1:
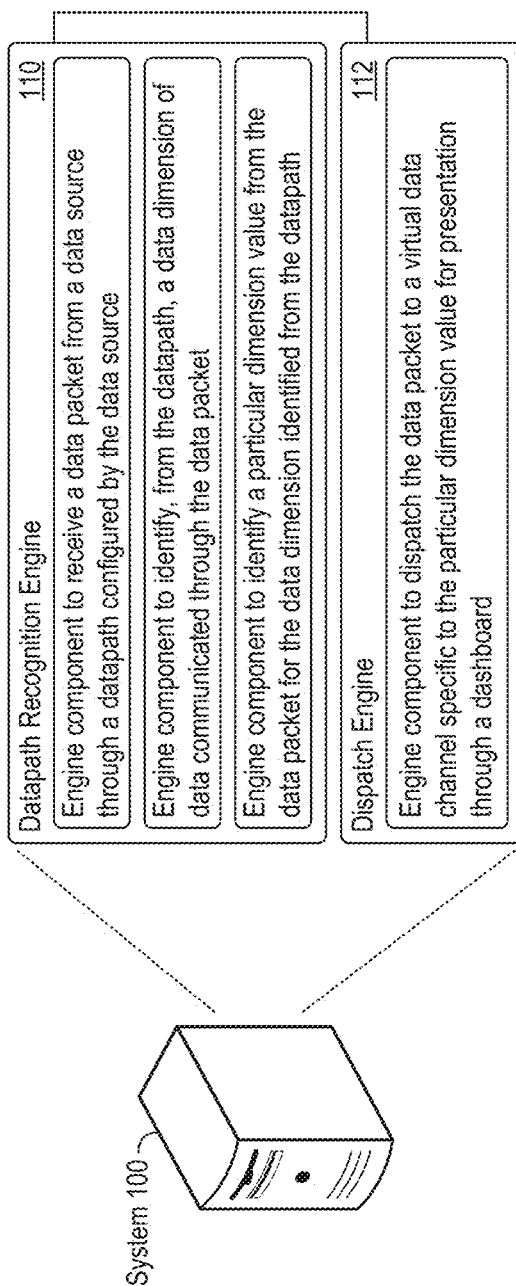
FIG. 1 shows an example of a system that supports data dispatch to a virtual data channel for presentation through a dashboard.

FIG. 1 shows an example of a system 100 that supports data dispatch to a virtual data channel for presentation through a dashboard. The system 100 may take the form of a computing system, including a single or multiple computing devices such as application servers, compute nodes, desktop or laptop computers, smart phones or other mobile devices, table devices, embedded controllers, and more. In some examples, the system 100 is part of a management system that collects and visualizes data from various data sources in a business, organization, communication network, datacenter or data warehouse, cloud solution system, or any other system from which data can be collected and measured. For instance, the management system may display collected data according to metrics, such as performance (e.g. performance of IT components or an organization), sensor measurements, traffic (e.g. in a network), correlations between any data points, predictions of any data points, results of data mining, prices, costs, revenue, sales, online status of users, or any other measurable data metric. Collected data may be analyzed, processed, and presented through a dashboard, which may also be referred to as a digital dashboard.

As described in greater detail below, the system 100 may receive data from various data sources and dispatch the received data into virtual data channels according to the datapath through the data source communicates data to the system 100, the content of the communicated data itself, any parameter tags specified by the data source, or a combination thereof. The virtual data channels may provide mechanisms (e.g., virtual constructs) to sort data according to any number of parameters, examples of which may include data dimensions, data sources, data schemas, or any configurable parameter tag specified by a data source. As such, the system 100 may include logic, engines, or circuitry to receive data from various data sources, identify data dimensions of the received data according to the datapath and inspection of the data itself, and dispatch the data into corresponding virtual data channels.

As one example, the system 100 shown in FIG. 1 includes a datapath recognition engine 110 and a dispatch engine 112. The system 100 may implement the engines 110 and 112 (and components thereof) in various ways, for example as hardware and programming. The programming for the engines 110 and 112 may take the form of processor-executable instructions stored on a non-transitory machine-readable storage medium and the hardware for the engines 110 and 112 may include a processing resource to execute those instructions. A processing resource may take the form of single processor or multi-processor systems, and in some examples, the system 100 implements multiple engines using the same computing system features or hardware components (e.g., a common processing resource).

The datapath recognition engine 110 may include engine components to receive a data packet from a data source through a datapath configured by the data source; identify, from the datapath, a data dimension of data communicated through the data packet; and identify a particular dimension value from the data packet for the data dimension identified from the datapath. The dispatch engine 112 may include an engine component to dispatch the data packet to a virtual data channel specific to the particular dimension value for presentation through a dashboard. Some example features relating to data dispatch to virtual data channels for presentation through a dashboard are described in greater detail next.

Figure 2:
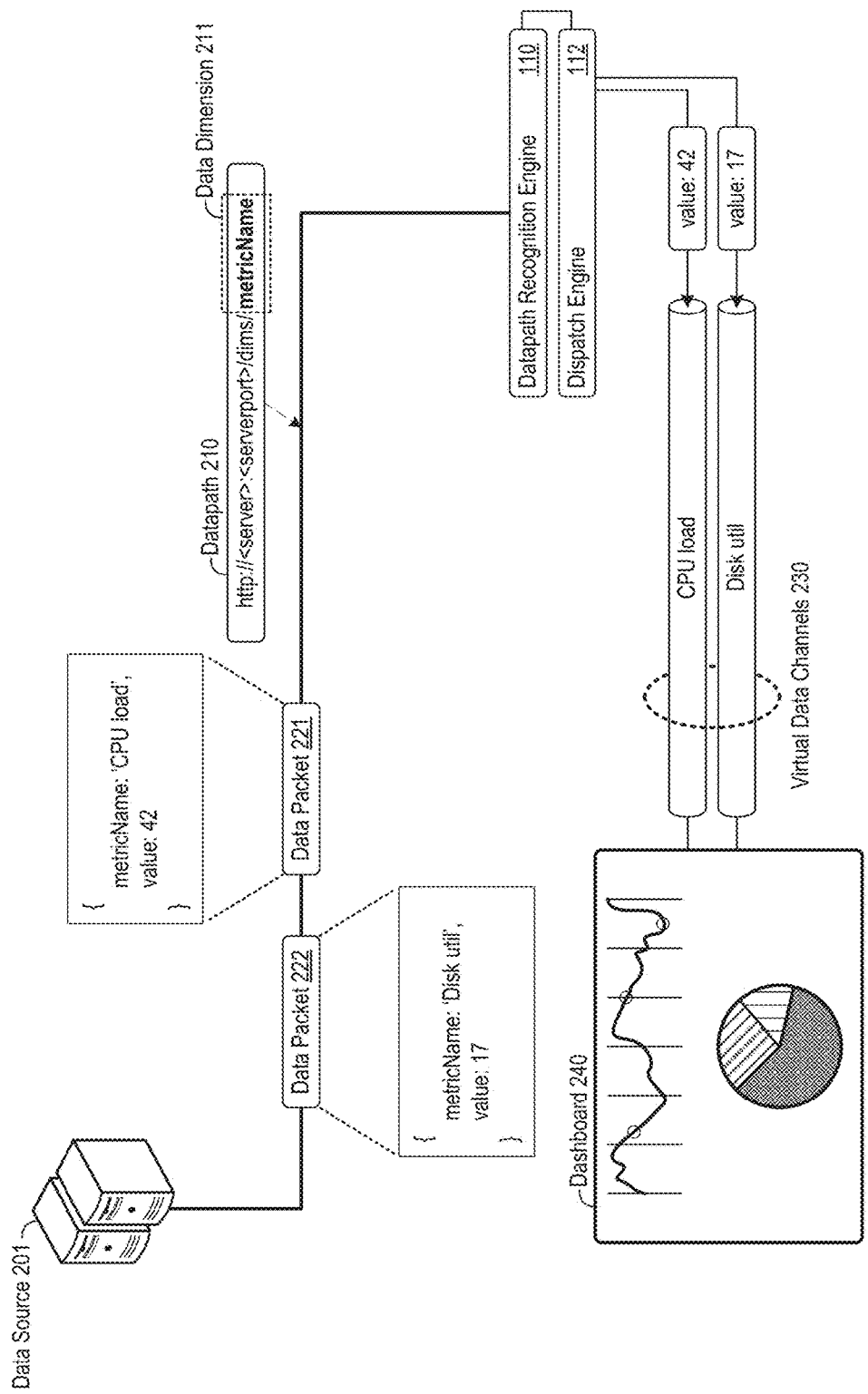
FIG. 2 shows an example of data dispatch to virtual data channels for data communicated through a datapath configured by a data source.

FIG. 2 shows an example of data dispatch to virtual data channels for data communicated through a datapath configured by a data source. The example shown in FIG. 2 includes a data source 201, which may be any physical or logical entity that generates data, provides data to a management system, or sources data in various other ways. In that regard, the data source 201 may send data streams of collected data that feed into charts, tables, widgets, or other visual elements of a dashboard, such as a dashboard widget displaying a metric value over a period of time.

The datapath recognition engine 110 may support receiving data from the data source 201 in any data format or schema supported by the data source 201. For example, the data source 201 may send data to the datapath recognition engine 110 as a value or tuple of values without transforming the data into a predetermined schema for analysis or presentation in a dashboard. Instead, the datapath recognition engine 110 may discern characteristics of data communicated by the data source 201, regardless of the data format employed by the data source 201, and through any number of dimension or attribute recognition techniques. In doing so, the datapath recognition engine 110 may operate in connection with the dispatch engine 112 in dispatching received data into corresponding virtual data channels.

To support data characterization, the datapath recognition engine 110 may determine characteristics of communicated data via a datapath through which the data source 201 communicates the data, data values within the data itself, or combinations of both. In some examples, the data source 201 may configure the datapath through which it communicates data to the datapath recognition engine 110. By configuring the datapath, the data source 201 may indicate a data characteristic, format, or schema for communicated data through the datapath itself, including explicitly specifying data dimensions or other parameter tags for communicated data.

To illustrate through the example shown in FIG. 2, the data source 201 sends data to the datapath recognition engine 110 through the datapath 210, which may take the form of a universal resource locator (URL) link. Datapaths in the form of a URL link are used as continuing example herein. However, the datapath recognition engine 110 may similarly and consistently identify characteristics of communicated data for other types of datapaths as well. In FIG. 2, the datapath 210 configured by the data source 201 is the URL link http://<server>:<serverport>/dims/metricName. The <server> and <serverport> fields of the datapath 210 may indicate the internee protocol (IP) address and port at which the datapath recognition engine 110 (or the system 100) listens for data from data sources. In some examples, the URL link may include other elements as well, such as an application program interface (API) specification or any other application indication associated with collecting data from data sources.

Within the datapath 210 itself, the data source 201 may specify a data dimension 211 included in data communicated by the data source 201. A data dimension may refer to a parameter, metric, characteristic, field, property, or any other attribute included in the communicated data. In FIG. 2, the datapath 210 includes a data dimension 211 specified as metricName, through which the data source 201 may indicate to the datapath recognition engine 110 a particular dimension of communicated data. For a datapath in the form of a URL link, the datapath recognition engine 110 may identify the data dimension 211 as a URL parameter specified within the URL link itself.

Upon receiving data from the data source 201, the datapath recognition engine 110 may characterize the received data according to various data characteristics identified from the datapath 210. To illustrate through FIG. 2, packet data of the data packets 221 and 222 sent by the data source 201 through the datapath 210 respectively include a particular dimension value for the metricName dimension specified in the datapath 210. The datapath recognition engine 110 may identify a particular dimension value for the identified metricName dimension, particularly a "CPU load" dimension value for the data packet 221 and a "Disk util" dimension value for the data packet 222. As such, the datapath recognition engine 110 may determine that the data communicated through the data packet 221 corresponds to a metric named "CPU load" and that the data communicated through the data packet 222 corresponds to a metric named "Disk util".

In the illustration above, the datapath recognition engine 110 identifies characteristics of data communicated from the data source 201 even when the communicated data does not conform to a particular format or schema predetermined or mandated by a management system, dashboard visualization element, or even by the datapath recognition engine 110 itself. That is, the datapath recognition engine 110 may flexibly support any number of various data formats and schemas used by different data sources, and characterize communicated data regardless of the format or schema through which a data source communicates the data. The data source 201 also need not perform an upfront (and potentially costly) transformation of data into a preset schema driven by a target visualization element or target widget of a dashboard. Instead, the datapath recognition engine 110 may flexibly characterize received data from the data source 201 regardless of which visualization element or widget will eventually display the data or if the data is even displayed at all.

The dispatch engine 112 may dispatch data received from the data source 201 to a virtual data channel. A virtual data channel may refer to any construct by which the dispatch engine 112 sorts, differentiates, catalogs, or otherwise separates data. Thus, a virtual data channel may take the form of, for example, a table, queue, database, list, or any other data structure or combination of data structures that stores data in a differentiated manner according to data characteristics (e.g., data dimension). In the example shown in FIG. 2, the dispatch engine 112 may dispatch data received from the data source 201 into the virtual data channels 230 specific to a particular dimension value for the metricName dimension included in the received data packets. Thus, for the data packets 221 and 222, the dispatch engine 112 may dispatch the data from the data packet 221 into a "CPU load" virtual data channel and dispatch the data from the data packet 222 into a "Disk util" virtual data channel.

The dispatch engine 112 may dispatch data to a virtual data channel by dispatching selected portions of a data packet or the data packet in its entirety. In some examples, the dispatch engine 112 dispatches the entire data packet itself to a virtual data channel, thus preserving the entire data packet for subsequent reference. In other examples, the dispatch engine 112 dispatches a selected portion of a data packet to the virtual data channel. For instance, the dispatch engine 112 may dispatch a packet payload, specific values or portions of the data packet, a particular message or element of the data packet (e.g., a JavaScript Object Notation (JSON) message or an eXtensible Markup Language (XML) message specifying the dimension and metric values), a value tuple, a particular value or set of values in the data packet, or any other specific portion of the packet. In the example shown in FIG. 2, the dispatch engine 112 dispatches value data to the virtual data channels 230, shown as the value of "19" dispatched to the "CPU load" virtual data channel and the value of "17" dispatched to the "Disk util" virtual data channel.

The dispatch engine 112 may create and maintain virtual data channels for data received from any number of data sources. In some examples, the dispatch engine 112 creates a new virtual data channel when no current virtual data channel characterizes data received from a data source. To illustrate through FIG. 2, the data packet 221 may be the first packet that the datapath recognition engine 110 that includes the particular dimension value "CPU load" for the metricName dimension specified in the datapath 210. The data packet 221 may be an initial packet in a datastream sent from the data source 201 that provides metric data for the CPU load of a device or system, for example. The datapath recognition engine 110 may identify the "CPU load" dimension value from the data packet 221 and the dispatch engine 112 may create a virtual data channel for data with a particular dimension value of "CPU Load" for the metricName dimension. The dispatch engine 112 may do so by, for example, allocating a new data structure, portion of an existing data structure, any other virtual construct as the virtual data channel. Then, the dispatch engine 112 may dispatch the data from the data packet 221 to the newly created "CPU load" virtual data channel.

The virtual data channels 230 to which data is dispatched may store the data for presentation through a dashboard. An example dashboard is shown in FIG. 2 as the dashboard 240, which may present data collected from the data source 201 (and any number of other data sources). Through the datapath recognition engine 110 and dispatch engine 112, the data stored in the virtual data channels 230 may be characterized or sorted for presentation, even though the data schema and format through which the data was communicated was set by the data source 201. Thus, the datapath recognition engine 110 and dispatch engine 112 may provide increased efficiency and flexibility in receiving and presenting data through the dashboard 240 from any number of arbitrary data sources and according to any number of data formats configured by the data sources.

Figure 3:
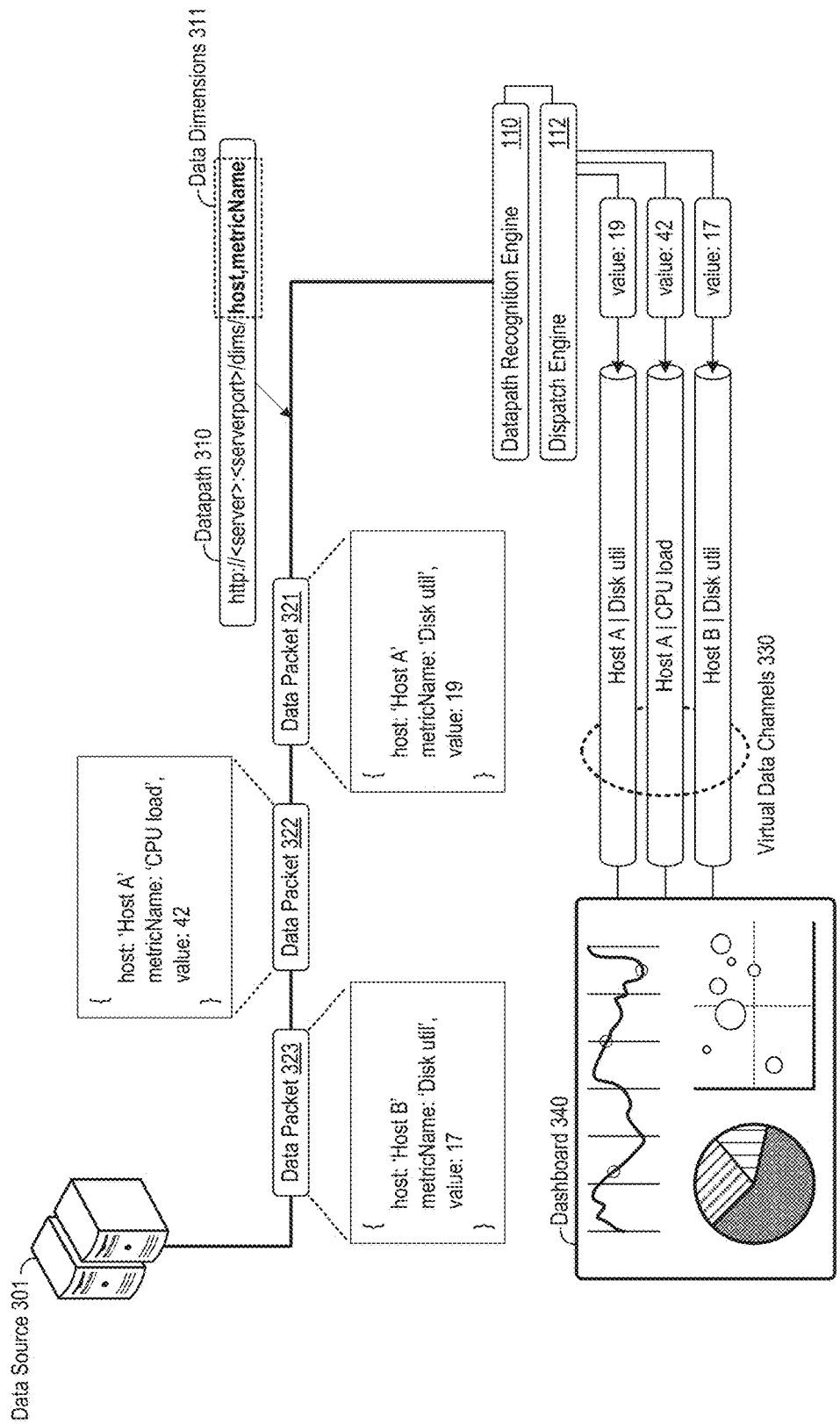
FIG. 3 shows an example of data dispatch to virtual data channels for data communicated through a datapath that specifies multiple data dimensions.

FIG. 3 shows an example of data dispatch to virtual data channels for data communicated through a datapath that specifies multiple data dimensions. In the example shown in FIG. 3, the data source 301 provides data to the datapath recognition engine 110 for presentation through a dashboard. In particular, the data source 301 configures the datapath 310 as the example URL link http://<server>:<serverport>/dims/host,metricName, which includes multiple specified data dimensions 311. As seen in FIG. 3, the data dimensions 311 include a host dimension and a metricName dimension configured by the data source 301 in the datapath 310. The multiple data dimensions are distinguished in the datapath 310 by a delineator, particularly by a comma ",", separating the host and metricName dimensions. By specifying multiple data dimensions in the datapath 310, the data source 301 may indicate multiple data dimensions that data communicated by the data source 301 includes, allowing the datapath recognition engine 110 and dispatch engine 112 dispatch communicated data with finer granularity and greater precision.

The datapath recognition engine 110 may identify each of the data dimensions 311 specified in the datapath 310. Upon receiving data from the data source 301 through the datapath 310, the datapath recognition engine 110 may parse the received data for each of the identified data dimensions 311. One such illustration is shown in FIG. 3 through the data packets 321, 322, and 323 sent by the data source 301 to the datapath recognition engine 110. For the data packet 321, the datapath recognition engine 110 identifies a particular dimension value of "Host A" for the host dimension and a particular dimension value of "Disk util" for the metricName dimension. Accordingly, the dispatch engine 112 may dispatch the data from the data packet 321 into a virtual data channel specific to the identified dimension values. In FIG. 3, the dispatch engine 112 dispatches the value "19" to the virtual data channel specific to the "Host A" and "Disk util" dimension values, labeled as the "Host A|Disk util" virtual data channel. The datapath recognition engine 110 and dispatch engine 112 may similarly parse the data packets 322 and 323 and dispatch received data from the data packets 322 and 323 to the virtual data channels labeled as "Host A|CPU load" and "Host B|Disk util" respectively.

As described above, the dispatch engine 112 may dispatch data received from the data source 301 into various virtual data channels distinguished according to the data dimensions 311 identified from the datapath 310. In the example shown in FIG. 3, the dispatch engine 112 dispatches the data from the data packets 321, 322, and 323 into the virtual data channels 330, which may support presentation of the received data through the dashboard 340.

In identifying data dimensions specified in a datapath itself, the datapath recognition engine 110 may identify particular data formats, schemas, or attributes for data communicated from a data source. In some examples, the datapath recognition engine 110 may identify parameter tags specified in the datapath, as another mechanism to characterize data received from a data source. A parameter tag may refer to a specified data characteristic which may characterize the communicated data without regard to the content of the data. Put another way, the parameter tag may indicate an attribute associated with the data that is not included within the data itself.

One scenario in which a parameter tag may be used is when the datapath recognition engine 110 receives data from multiple data sources through datapaths that specify identical data dimensions. In this scenario, parameter tags may differentiate between the multiple data sources, supporting differentiation of the different data sources in a dashboard by dispatching of the data from the different data sources into different virtual data channels. One such example is presented next in FIG. 4.

Figure 4:
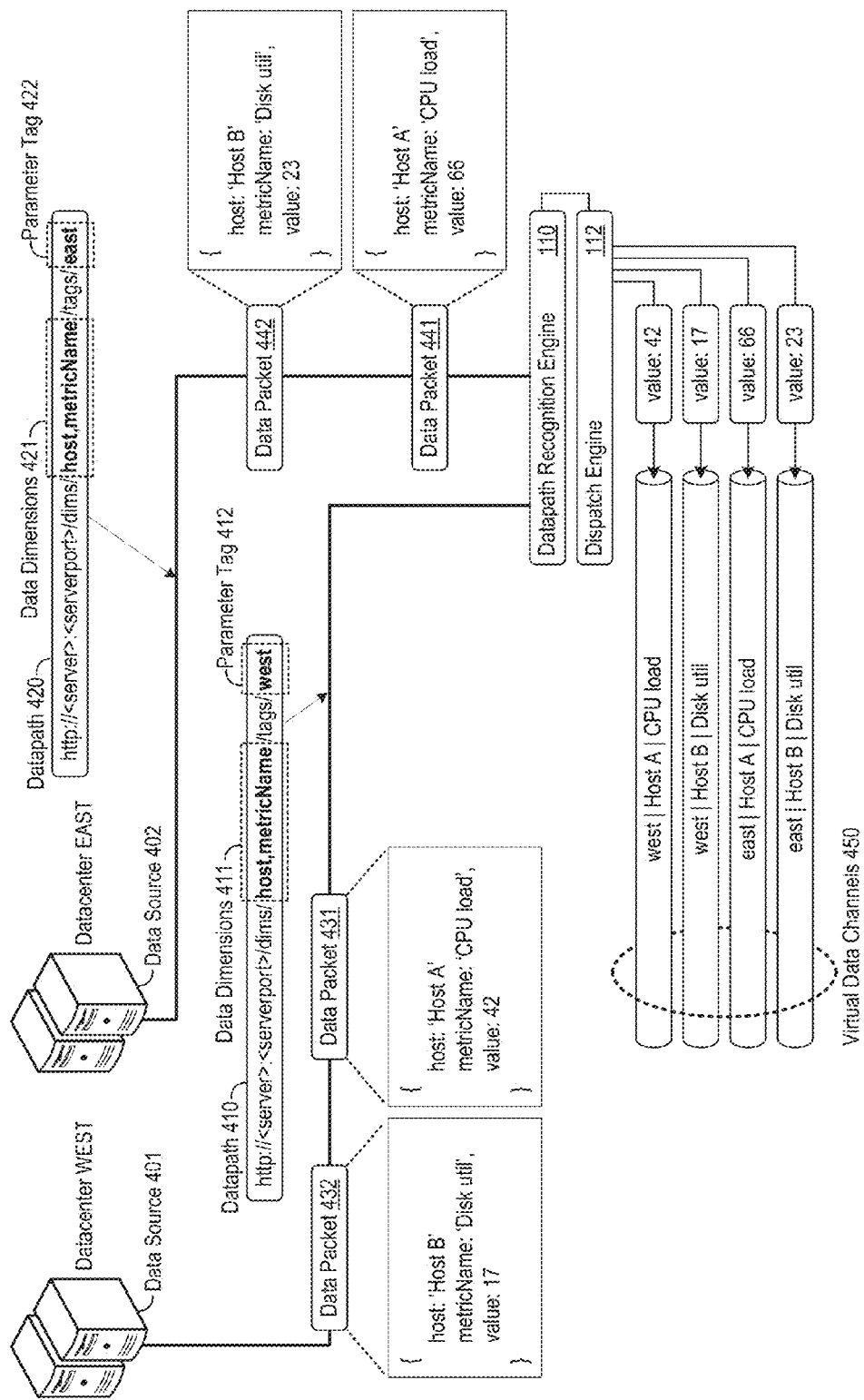
FIG. 4 shows an example of example of data dispatch to virtual data channels for data communicated through datapaths specified by different data sources.

FIG. 4 shows an example of example of data dispatch to virtual data channels for data communicated through datapaths specified by different data sources. In FIG. 4, the datapath recognition engine 110 receives data from a data source 401 and a data source 402. The data sources 401 and 402 may be, for example, different data centers operated by a common entity. In FIG. 4, the data source 401 is also identified as "Datacenter WEST" and the data source 402 identified as "Datacenter EAST".

The data sources 401 and 402 may respectively configure a datapath to communicate collected data to the datapath recognition engine 110. In the example shown in FIG. 4, the data source 401 configures the datapath 410 as http://<server>:<serverport>/dims/host,metricName/tags/west which includes the data dimensions 411 specified as a host dimension and a metricName dimension. The datapath 410 also includes a parameter tag 412 as a west parameter tag. The data source 402 configures the datapath 420 as http://<server>:<serverport>/dims/host,metricName/tags/east which includes the data dimensions 421 that are identical to the data dimensions 411 specified in the datapath 410 configured by the data source 401. The parameter tag 422 of the datapath 420 is specified as an east parameter tag.

The datapath recognition engine 110 may identify data dimensions and parameter tags at different portions of a configured datapath. In some examples, the datapath recognition engine 110 identifies delineators specified in the datapath itself, indicating when data dimensions or parameters are respectively being specified. For instance, a URL link may include a data dimension delineator in the form of a /dims/ text string, which may indicate the beginning of a portion of the URL link specifying data dimensions included in data communicated through the datapath. As another example, the URL link may include a parameter tag delineator in the form of a /tags/ text string, which may indicate the beginning of a portion of the URL link specifying parameter tags characterizing data communicated through the datapath not specified or included within the data itself.

The datapath recognition engine 110 may differentiate between data sources that specify identical dimension through parameter tags specified in the configured datapaths. In the example shown in FIG. 4, the data source 401 communicates the data packets 431 and 432 through the datapath 410 and the data source 402 communicates the data packets 441 and 442 through the datapath 420. For both the data packet 431 received from the data source 401 and the data packet 441 received from the data source 402, the datapath recognition engine 110 may identify identical dimension values, e.g., a "Host A" dimension value for the host dimension and a "CPU load" dimension value for the metricName dimension. Nonetheless, the datapath recognition engine 110 may differentiate between the data of the data packet 431 and the data packet 441 according to the parameter tags 412 and 422 specified in the datapaths 410 and 420 respectively.

Along similar lines, the datapath recognition engine 110 may differentiate between data of the data packet 432 and the data packet 442 even when the data packets 432 and 442 include identical dimension values. As such, the datapath recognition engine 110 may differentiate a data packet from a different data packet that includes the same particular dimension values according to a parameter tag specified in the datapath that is not specified in a different datapath used to communicate the different data packet.

The dispatch engine 112 may dispatch data into virtual data channels specific to identified dimension values, identified parameter tags, or a combination of both. In some examples, the dispatch engine 112 dispatches the data of a data packet to a virtual data channel specific to both a particular dimension value identified from the data packet and a parameter tag specified in the datapath through which the data packet was communicated and dispatches data of a different data packet to a different virtual data channel specific to the particular dimension value, but not the parameter tag.

In FIG. 4, the dispatch engine 112 dispatches data into the virtual data channels 450 according to dimension values for the host and metricName dimensions as well as a parameter tag specified in the datapath that the data source communicate data through. Thus, the virtual data channels 450 may include virtual data channels specific to the various dimension values for the host and metricName dimensions as well as the specific parameter tag(s) specified in a datapath that a packet is communicated through. As seen in FIG. 4, the virtual data channels 450 include a virtual data channel specific to the west parameter tag specified in the datapath 410 and the "Host A" and "CPU load" dimension values of the data dimensions 411 specified in the datapath 410. The virtual data channels 450 shown in FIG. 4 also include virtual data channels specific to the other combination of dimension values and parameter tags for the data packets 432, 441, and 442 as well. The virtual data channels 450 may store data for presentation into a dashboard (not shown in FIG. 4).

Figure 5:
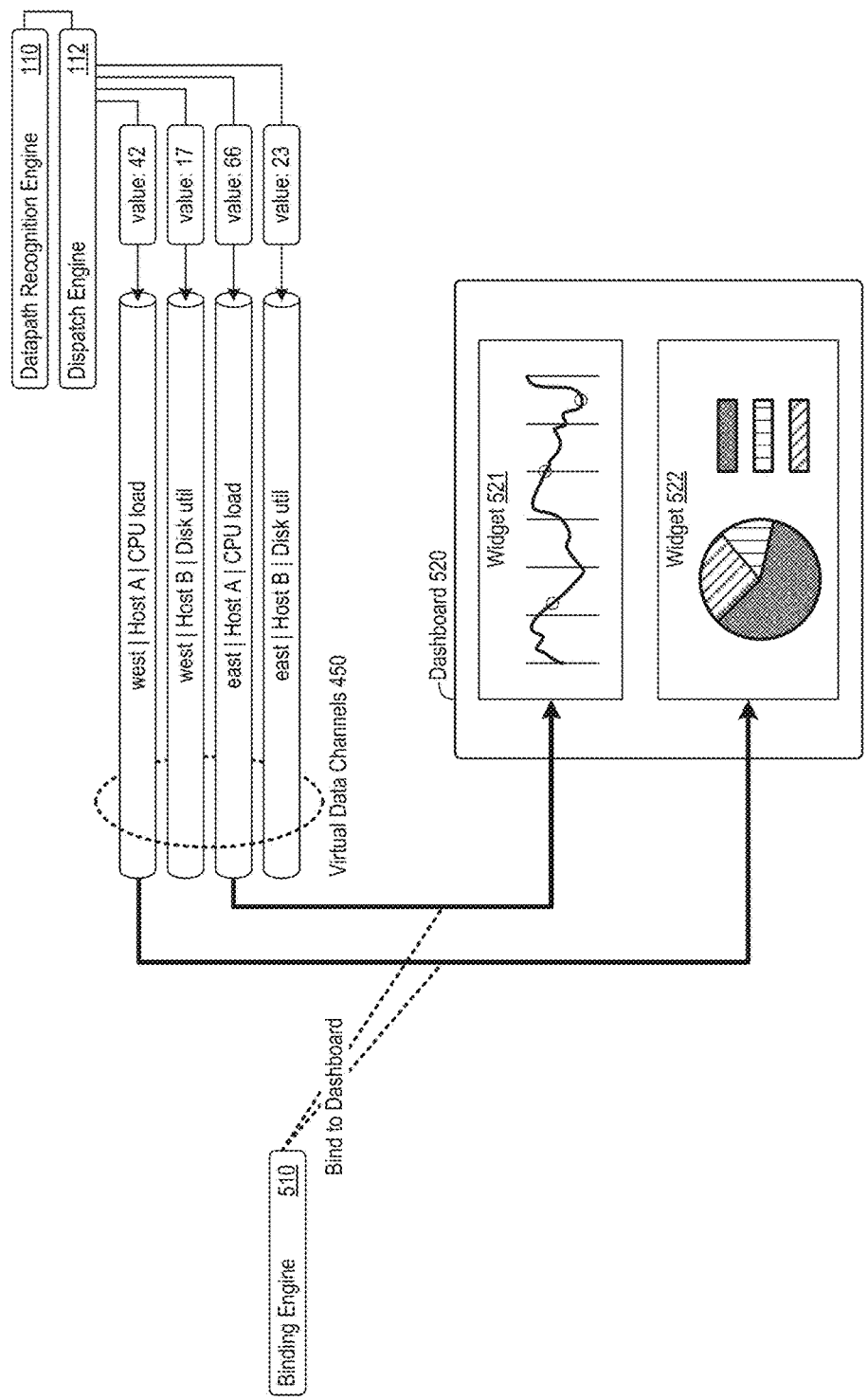
FIG. 5 shows an example binding of virtual data channels to a dashboard.

FIG. 5 shows an example binding of virtual data channels to a dashboard. In some examples, the system 100 or another management system may include a binding engine 510 to bind virtual data channels to a dashboard. A system or device may implement the binding engine 510 (and components thereof) in various ways, for example as hardware and programming. The programming for the binding engine 510 take the form of processor-executable instructions stored on a non-transitory machine-readable storage medium and the hardware for the binding engine 510 may include a processing resource to execute those instructions.

The example in FIG. 5 uses the virtual data channels 450 from the example in FIG. 4 discussed above, and the binding engine 510 may bind none, some, or all of the virtual data channels 450 to a dashboard for presentation of the data dispatched to the virtual data channels 450. In the specific example shown in FIG. 5, the binding engine 510 binds the virtual data channels labeled as the "west|Host A|CPU load" and "east|Host A|CPU load" virtual channels to the dashboard 520.

The binding engine 510 may bind a virtual data channel to a widget of the dashboard 520. A widget may refer to a user interface component that displays data, for example through text, numbers, gauges, indicators, charts, graphs, or the like. The binding engine 510 may support binding of virtual data channels to widgets in the dashboard, flexibly providing user-selection capabilities and customization to display user-selected data dispatched into the virtual data channels. The dashboard 520 shown in FIG. 5 includes the two widgets labeled as 521 and 522.

In binding a virtual data channel to a widget, the binding engine 510 may provide a listing of the virtual data channels to which the dispatch engine 112 has dispatched data. The binding engine 510 may also list the particular dimension values or parameter tags specific to the virtual data channel, thus informing a user of the type, source, or other attributes of the data dispatched to the various virtual data channels. Upon receiving a selection of a particular virtual data channel to bind, the binding engine 510 may link the widget (or interface of the widget) to the selected virtual data channel. In other words, the binding engine 510 may initiate forwarding of data dispatched to the selected virtual data channel to the dashboard widget for presentation through the dashboard.

Figure 6:
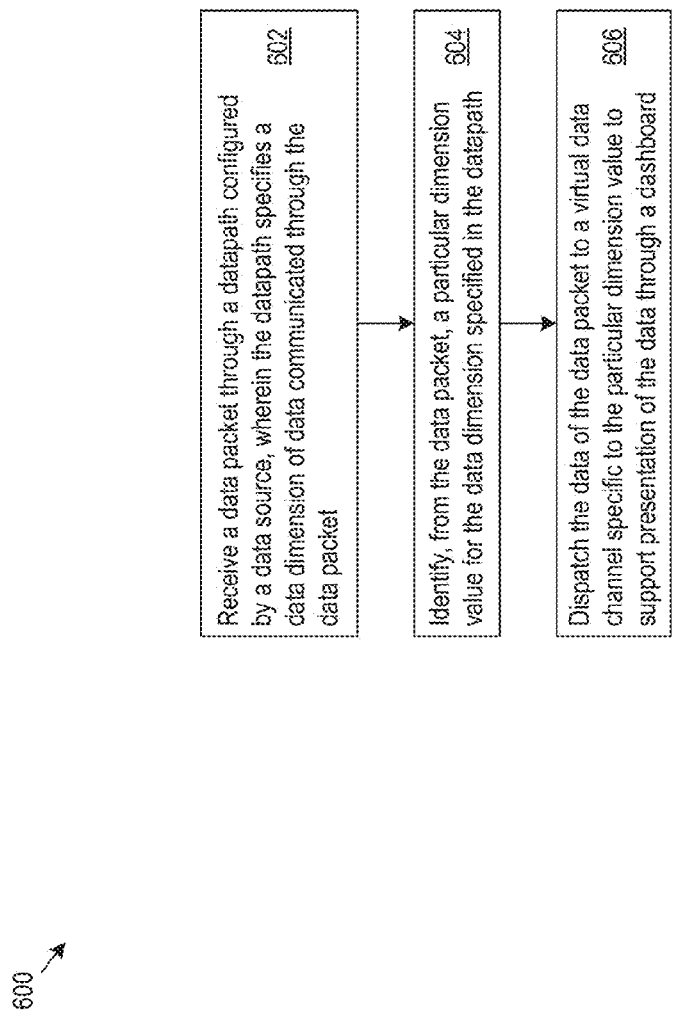
FIG. 6 shows an example of logic that a system or device may implement to support data dispatch to a virtual data channel for presentation through a dashboard

FIG. 6 shows an example of logic 600 that a system may implement to support data dispatch to a virtual data channel for presentation through a dashboard. For example, the system 100 may implement the logic 600 as hardware, executable instructions stored on a machine-readable medium, or as combinations thereof. The system 100 may implement the logic 600 through the datapath recognition engine 110 and the dispatch engine 112, for example, through which the system 100 may perform or execute the logic 600 as a method to receive and dispatch data to virtual data channels for presentation through a dashboard.

In implementing the logic 600, the datapath recognition engine 110 may receive a data packet through a datapath configured by a data source, wherein the datapath specifies a data dimension of data communicated through the data packet (602). As noted above, the datapath may take the form of a URL link configured by the data source, and the URL link itself may specify the data dimension through a URL parameter. The datapath recognition engine 110 may also identify, from the data packet, a particular dimension value for the data dimension specified in the datapath (604). In implementing the logic 600, the dispatch engine 112 may dispatch the data of the data packet to a virtual data channel specific to the particular dimension value to support presentation of the data through a dashboard, for example in any of the ways described herein.

When the datapath takes the form of a URL link, the logic 600 may further include parsing the URL link through which the data packet is received to identify the data dimension, which the datapath recognition engine 110 may implement, perform, or both. The logic 600 may further include comprising identifying a parameter tag specified in the datapath that specifies an additional parameter for the data packet that is not specified in the data packet itself, e.g., via the datapath recognition engine 110. In this example, the dispatch engine 112 may dispatch the data of the data packet to the virtual data channel, the virtual data channel also specific to the additional parameter specified by the parameter tag. The logic 600 may further include binding the virtual data channel to a widget of the dashboard, which the binding engine 510 may implement, perform, or both.

Figure 7:
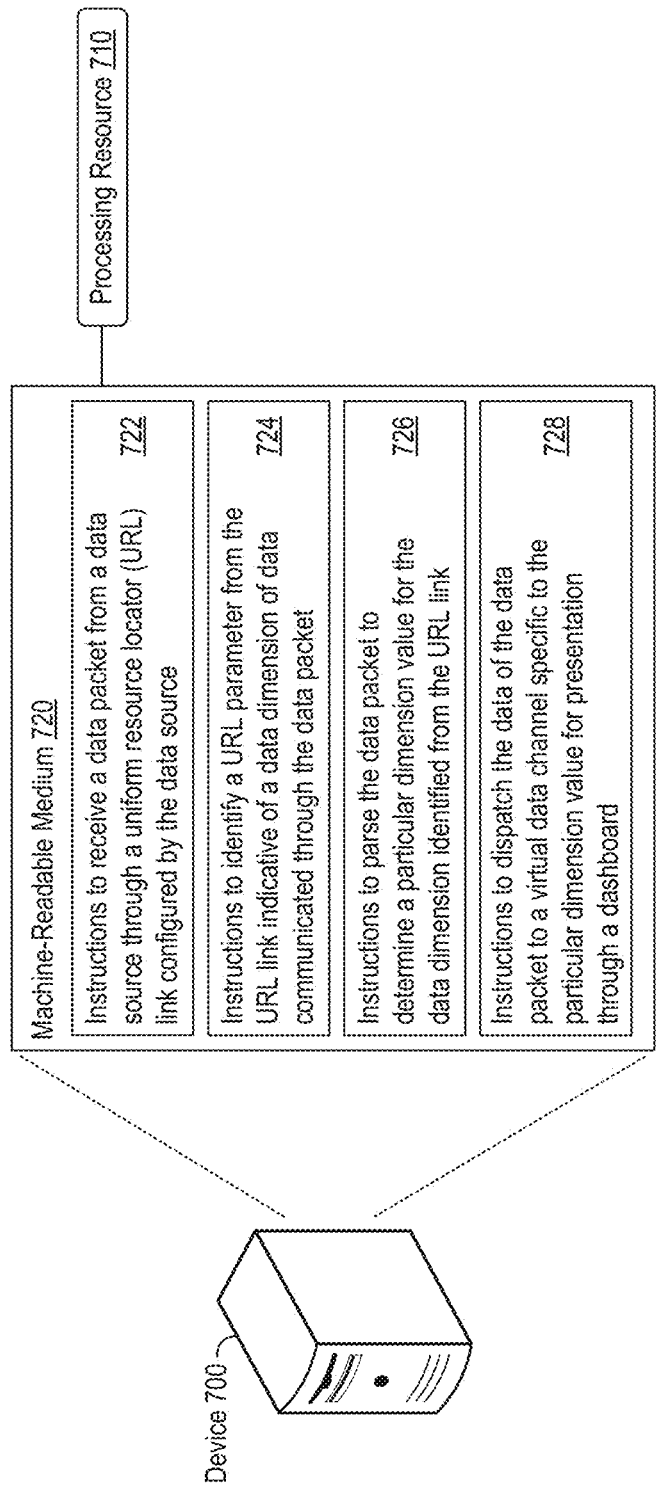
FIG. 7 shows an example of a system that supports data dispatch to a virtual data channel for presentation through a dashboard.

FIG. 7 shows an example of a system 700 that supports data dispatch to a virtual data channel for presentation through a dashboard. The system 700 may include a processing resource 710, which may take the form of a single or multiple processors. The processor(s) may include a central processing unit (CPU), microprocessor, or any hardware device suitable for executing instructions stored on a machine-readable medium. The system 700 may include a machine-readable medium 720. The machine-readable medium 720 may take the form of any non-transitory electronic, magnetic, optical, or other physical storage device that stores executable instructions, such as the instructions 722, 724, 726, and 728 shown in FIG. 7. As such, the machine-readable medium 720 may be, for example, Random Access Memory (RAM) such as a dynamic RAM (DRAM), flash memory, memristor memory, spin-transfer torque memory, an Electrically-Erasable Programmable Read-Only Memory (EEPROM), a storage drive, an optical disk, and the like.

The system 700 may execute instructions stored on the machine-readable medium 720 through the processing resource 710. Executing the instructions may cause the system 700 to perform any of the virtual data channel recognition and dispatch features described herein, including according to any of the features with respect to the datapath recognition engine 110, the dispatch engine 112, the binding engine 510, or any combination thereof. For example, execution of the instructions 722, 724, 726, and 728 by the processing resource 610 may cause the system 700 to receive a data packet from a data source through a URL link configured by the data source; identify a URL parameter from the URL link indicative of a data dimension of data communicated through the data packet; parse the data packet to determine a particular dimension value for the data dimension identified from the URL link; and dispatch the data of the data packet to a virtual data channel specific to the particular dimension value for presentation through a dashboard.

In some examples, the executable instructions stored on the machine-readable medium 720 are to identify multiple data dimensions of the data, including the data dimension, by identifying multiple URL parameters from the URL link; parse the data packet to identify a dimension value for each of the multiple data dimensions respectively, including the particular dimension value; and dispatch the data of the data packet to a virtual data channel specific to all of the identified dimension values, including the particular dimension value. As another example, executable instructions stored on the machine-readable medium 720 may further cause the system 700 to bind the virtual data channel to a widget of the dashboard.

As yet another example, executable instructions stored on the machine-readable medium 720 are further to identify a parameter tag in the URL link that identifies an additional parameter for the data packet that is not specified in the data packet itself and dispatch the data of the data packet to the virtual data channel, the virtual data channel also specific to the additional parameter. The executable instructions may, for example, cause the system 700 to identify the URL parameter indicative of the data dimension at a first portion of the URL link and the parameter tag at a second portion of the URL link that is delineated from the first portion. The URL link configured by the data source may specify data dimensions through a /dims/ delineator in the URL link, for example. Parameter tags may be specified through a /tags/ delineator.

The systems, methods, devices, and logic described above, including the datapath recognition engine 110, the dispatch engine 112, and the binding engine 510, may be implemented in many different ways in many different combinations of hardware, logic, circuitry, and executable instructions stored on a machine-readable medium. For example, the datapath recognition engine 110, the dispatch engine 112, the binding engine 510, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the datapath recognition engine 110, the dispatch engine 112, the binding engine 510, or combinations thereof.

The processing capability of the systems, devices, and engines described herein, including the datapath recognition engine 110, the dispatch engine 112, and the binding engine 510, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:
1. A system comprising:
a processor;
a non-transitory machine-readable storage medium to store instructions that, when executed by the processor, cause the processor to:
  receive a first data packet from a data source through a first datapath configured by the data source;
  identify, from the first datapath, a data dimension of data communicated through the first data packet;
  identify a particular dimension value from the first data packet for the data dimension identified from the first datapath;
  differentiate the first data packet from a second data packet that also includes the particular dimension value according to a parameter tag specified in the first datapath that is not specified in a second datapath used to communicate the second data packet;
dispatch the data of the first data packet to a first virtual data channel specific to both the particular dimension value and the parameter tag for presentation through a dashboard; and
dispatch data of the second data packet to a second virtual data channel specific to the particular dimension value, but not the parameter tag.

2. The system of claim 1, wherein the first datapath comprises a universal resource locator (URL) link; and
wherein the instructions, when executed by the processor, cause the processor to identify the data dimension as a URL parameter specified within the URL link itself.

3. The system of claim 1, wherein the parameter tag includes an additional parameter for the first data packet that is not specified in the first data packet itself.

4. The system of claim 3, wherein the instructions, when executed by the processor, cause the processor to dispatch the data of the first data packet to the first virtual data channel specific to the additional parameter.

5. The system of claim 1, wherein the instructions, when executed by the processor, cause the processor to identify the parameter tag by identifying a universal resource locator (URL) parameter in the first datapath indicated as a tag, and not a data dimension, for the first data packet.

6. The system of claim 1, wherein the instructions, when executed by the processor, cause the processor to bind the first virtual data channel to a widget of the dashboard.

7. The system of claim 6, wherein the instructions, when executed by the processor, cause the processor to bind the first virtual data channel to the widget in response to a user selection for presenting the first data packet through the widget.

8. A method comprising:
receiving a data packet through a datapath configured by a data source, wherein the datapath specifies a data dimension of data communicated through the data packet;
identifying, from the data packet, a particular dimension value for the data dimension specified in the datapath;
identifying a parameter tag specified in the datapath that specifies an additional parameter for the data packet that is not specified in the data packet itself, wherein identifying the parameter tag comprises identifying a universal resource locator (URL) parameter in the datapath indicated as a tag, and not a data dimension, for the data packet; and
dispatching the data of the data packet to a virtual data channel specific to the particular dimension value and to the additional parameter to support presentation of the data through a dashboard.

9. The method of claim 8, wherein the URL parameter is part of a URL link of the datapath.

10. The method of claim 9, further comprising parsing the URL link to identify the data dimension.

11. The method of claim 8, further comprising differentiating the data packet from a different data packet that also includes the particular dimension value according to the parameter.

12. The method of claim 8, further comprising binding the virtual data channel to a widget of the dashboard.

13. The method of claim 8, further comprising:
dispatching data of a different data packet to a different virtual data channel according to a different data dimension specified in a datapath through which the different data packet is communicated.

14. A method comprising:
receiving a first data packet through a datapath configured by a data source, wherein the datapath specifies a first data dimension of data communicated through the first data packet;
identifying, from the first data packet, a first dimension value for the first data dimension specified by the datapath;
dispatching the data of the first data packet to a first virtual data channel specific to the first dimension value to support presentation of the data through a dashboard;
receiving a second data packet through the datapath configured by the data source;
identifying, from the second data packet, a second dimension value for the first data dimension specified by the datapath; and
dispatching data of the second data packet to a second virtual data channel specific to the second dimension value.

15. The method of claim 14, wherein the datapath comprises a universal resource locator (URL) link, the method further comprising:
identifying multiple data dimensions of the data of the first data packet, including the first data dimension, by identifying multiple URL parameters from the URL link; and
parsing the first data packet to identify a dimension value for each of the multiple data dimensions, respectively, including the first dimension value,
wherein dispatching the data of the first data packet comprises dispatching the data of the first data packet to a virtual data channel specific to all of the identified dimension values, including the first dimension value.

16. The method of claim 14, wherein the datapath comprises a universal resource locator (URL) link, the method further comprising:
identifying a URL parameter tag in the URL link, wherein the URL parameter tag identifies an additional parameter for the first data packet, and the additional parameter is not specified in the first data packet itself,
wherein dispatching the data of the first data packet comprises dispatching the data of the first data packet to a virtual data channel specific to both the additional parameter and to the first dimension value.

17. The method of claim 16, further comprising:
identifying a URL parameter indicative of the first data dimension at a first portion of the URL link,
wherein identifying the URL parameter tag comprises identifying the URL parameter tag at a second portion of the URL link, and the first portion of the URL link is delineated from the second portion of the URL link.

18. The method of claim 14, further comprising:
binding the first virtual data channel to a widget of the dashboard.

* * * * *